United States Patent
Juhlin-Dannfelt et al.

(10) Patent No.: US 8,972,126 B2
(45) Date of Patent: Mar. 3, 2015

(54) METHOD AND SYSTEM FOR CONTROL OF A GEARBOX

(75) Inventors: Peter Juhlin-Dannfelt, Hägersten (SE); Fredrik Swartling, Södertälje (SE); Peter Asplund, Mariefred (SE)

(73) Assignee: Scania CV AB (SE)

( * ) Notice: Subject to any disclaimer, the term of this patent is extended or adjusted under 35 U.S.C. 154(b) by 112 days.

(21) Appl. No.: 13/521,260

(22) PCT Filed: Jan. 31, 2011

(86) PCT No.: PCT/SE2011/050097
§ 371 (c)(1),
(2), (4) Date: Aug. 8, 2012

(87) PCT Pub. No.: WO2011/093789
PCT Pub. Date: Aug. 4, 2011

(65) Prior Publication Data
US 2012/0296534 A1    Nov. 22, 2012

(30) Foreign Application Priority Data
Feb. 1, 2010   (SE) ........................ 1050099

(51) Int. Cl.
*F16H 59/52* (2006.01)
*F16H 59/66* (2006.01)
(Continued)

(52) U.S. Cl.
CPC ............ *F16H 61/0213* (2013.01); *B60W 10/11* (2013.01); *B60W 30/18027* (2013.01);
(Continued)

(58) Field of Classification Search
CPC .......... F16H 2061/023; F16H 2312/02; F16H 61/0248; B60W 10/11; B60W 50/082; B60W 30/18027

USPC ............................................ 701/52
See application file for complete search history.

(56) References Cited

U.S. PATENT DOCUMENTS

| 5,506,771 A | 4/1996 | Chan ......................... 364/424.1 |
| 5,761,628 A | 6/1998 | Steeby ........................... 701/64 |

(Continued)

FOREIGN PATENT DOCUMENTS

| DE | 10 2004 042 207 A1 | 3/2006 |
| EP | 1 134 111 A2 | 9/2001 |

(Continued)

OTHER PUBLICATIONS

Japanese Office Action, dated Nov. 5, 2013, issued in corresponding Japanese Application No. 2012-551131. English translation included. Total 2 pages.

(Continued)

*Primary Examiner* — John Q Nguyen
*Assistant Examiner* — Anshul Sood
(74) *Attorney, Agent, or Firm* — Ostrolenk Faber LLP

(57) ABSTRACT

A method for control of a vehicle gearbox which is automatically controlled by a control system. The control system's choice of transmission ratio is influenceable by the vehicle's driver. The control system chooses an initial transmission ratio for moving off stationary. The method includes determining a first initial transmission ratio by using the control system, and determining a second initial transmission ratio indicated by the vehicle driver. The gearbox is set to the second initial transmission ratio indicated by the driver when the second ratio is higher than the first initial transmission ratio determined by the control system.

10 Claims, 3 Drawing Sheets

(51) Int. Cl.
  *F16H 61/02* (2006.01)
  *B60W 10/11* (2012.01)
  *B60W 30/18* (2012.01)
  *B60W 50/08* (2012.01)
  *F16H 59/00* (2006.01)

(52) U.S. Cl.
  CPC ........... *B60W50/087* (2013.01); *B60Y 2200/14* (2013.01); *F16H 2059/006* (2013.01); *F16H 2061/023* (2013.01); *F16H 2312/02* (2013.01)
  USPC ........................................................ 701/52

(56) References Cited

U.S. PATENT DOCUMENTS

| | | | |
|---|---|---|---|
| 6,151,978 | A | 11/2000 | Huber |
| 2001/0023384 | A1 | 9/2001 | Nishimura |

FOREIGN PATENT DOCUMENTS

| | | |
|---|---|---|
| GB | 2 356 676 | 5/2001 |
| JP | 08-210498 | 8/1996 |
| KR | 10-232503 | 3/2000 |
| WO | WO 2005/003600 A1 | 1/2005 |
| WO | WO 2009/108087 A1 | 9/2009 |

OTHER PUBLICATIONS

International Search Report dated May 5, 2011 issued in corresponding international patent application No. PCT/SE2011/050097.
Korean Office Action, dated May 19, 2014, issued in corresponding Korean Patent Application No. 10-2012-7023083. English Translation. Total 6 pages.

METHOD AND SYSTEM FOR CONTROL OF A GEARBOX

CROSS-REFERENCE TO RELATED APPLICATIONS

The present application is a 35 U.S.C. §§371 national phase conversion of PCT/SE2011/050097, filed Jan. 31, 2011, which claims priority of Swedish Application No. 1050099-9, filed Feb. 1, 2010, the contents of which are incorporated by reference herein. The PCT International Application was published in the English language.

FIELD OF THE INVENTION

The present invention relates to a method for control of vehicle gearboxes. The invention relates in particular to a method according to the preamble of claim 1 for control of a vehicle gearbox.

BACKGROUND TO THE INVENTION

There are many different variants of power trains for vehicles. It is often desirable that heavy vehicles be drivable as comfortably as possible for the driver. This means, for example, that the gear changes of the gearbox should be executed automatically by the control system usually incorporated in the vehicle. Gearboxes which change gear automatically are therefore also usual in heavy vehicles.

Generally speaking, in driving of heavy vehicles such as trucks, buses and the like, vehicle economy has over time become an ever greater factor in the profitability of the activity in which the vehicle is used. Apart from its procurement cost, the main costs involved in routine operation of a heavy vehicle normally comprise pay for the driver, repair and maintenance costs, and fuel for propulsion of the vehicle.

Depending on the type of vehicle, the impact of different factors may vary, but fuel consumption is generally a major item of expenditure. Since the capacity utilization of heavy vehicles is often high, involving large overall fuel consumption, every possible way of reducing fuel consumption has a positive effect on profitability. One way of achieving this is to influence the way in which the control system makes gear choices and controls gear changes in the gearbox. For this reason, the control system often incorporates functions for improving fuel consumption by as far as possible effecting gear changes and making gear choices in as fuel-economizing a way as possible.

A certain measure of driver influence may in many situations be desirable, e.g. when it is necessary to change down to a lower gear than the vehicle's control system would otherwise have chosen. Automatic gear changing in heavy vehicles being usually controlled by a control system provides a possibility, which is therefore also often applied, of a mode of control whereby engine and gearbox control, and gear choice, are largely conducted by the control system alone but with a possibility, at least in certain situations, of gear choice being at least partly based also on commands from the vehicle's driver.

In general, the aforesaid automatic gear choice works well in many cases, but there are situations where gear choice by control system may lead to driver irritation. There therefore still are situations in which automatic gear choice can be further improved.

SUMMARY OF THE INVENTION

An object of the present invention is to propose a method for control of a gearbox of a vehicle whereby gear choice can be conducted in a way which, at least in certain situations, is viewed positively by the vehicle's driver.

The present invention relates to a method for control of a gearbox of a vehicle, said vehicle having a control system for automatic control of a gearbox which is connected to a combustion engine and which can be set to various different transmission ratios. The control system's choice of transmission ratio is influenceable by the vehicle's driver, and said control system is adapted to choosing an initial transmission ratio for setting said vehicle in motion from stationary. The method comprises:

using said control system to determine a first initial transmission ratio,
determining a second initial transmission ratio indicated by said vehicle driver, and
setting said gearbox to said second initial transmission ratio indicated by said vehicle driver when it is higher than said first initial transmission ratio determined by said control system.

The present invention thus provides the possibility of assurance that the vehicle will always set be in motion in a gear chosen by its driver (chosen transmission ratio) instead of in the gear which the control system finds most appropriate, provided that the gear chosen by the driver is lower (higher transmission ratio) than the gear chosen by the control system. This affords the advantage that the vehicle's driving in certain situations can be conducted in a way which is more desirable for the driver.

For example, it is usual for a driver in a queue of vehicles to use a mode selector to set the gearbox to a very low gear (i.e. high transmission ratio) in order to be able to travel slowly forwards with the engine idling without having to apply acceleration or braking. As queuing often involves frequently coming to a halt followed by setting in motion again, it may be very irritating if the vehicle's control system chooses at each halt a new higher initial gear (a lower transmission ratio) than the gear which the driver considers appropriate for queuing. The present invention makes it possible to avoid such irritation.

Further characteristics of the present invention and advantages thereof are indicated by the detailed description set out below of embodiment examples and the attached drawings.

DETAILED DESCRIPTION OF EMBODIMENT EXAMPLES

Figure 1A:
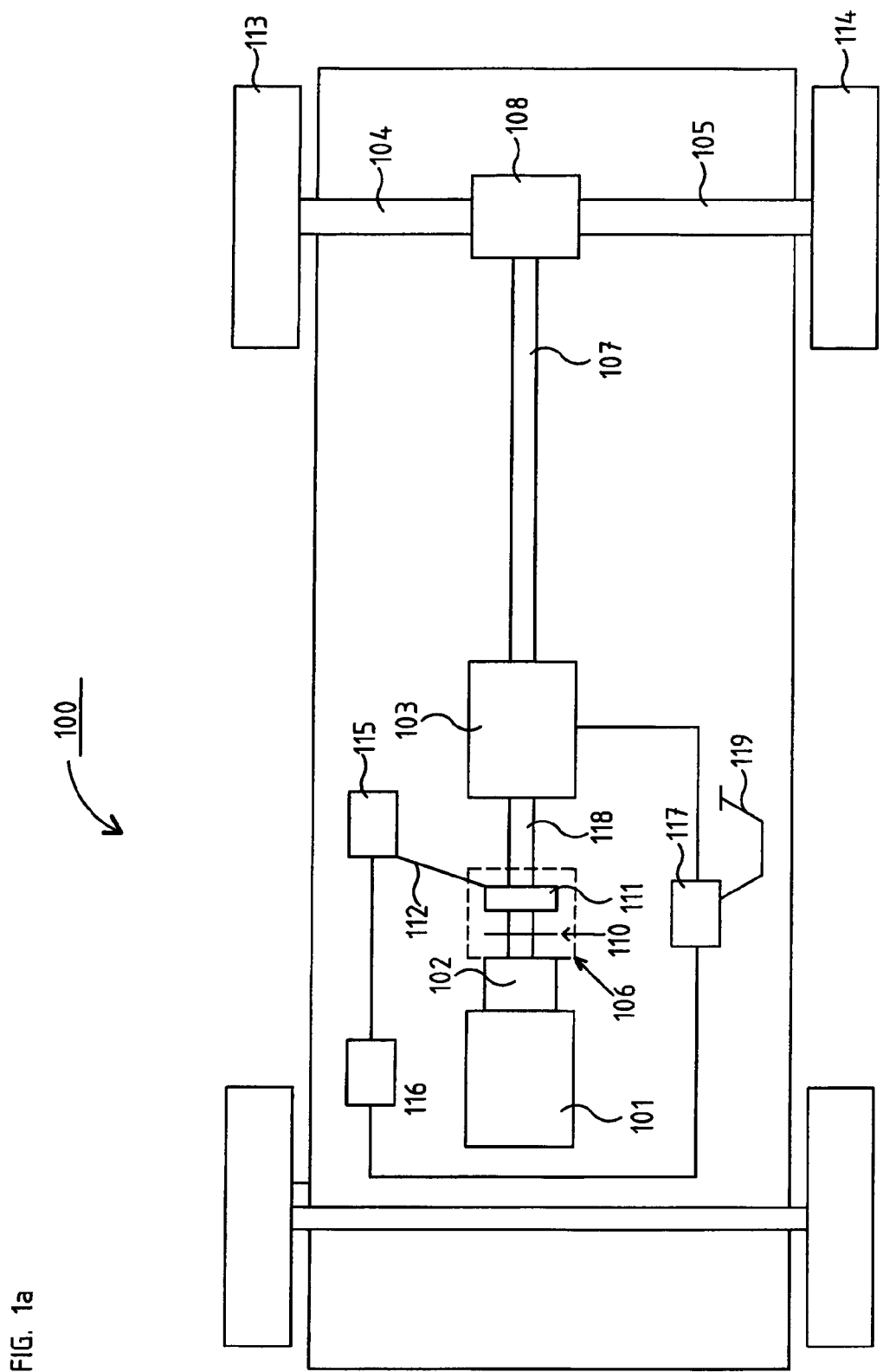
FIG. 1a depicts a power train in a vehicle in which the present invention may with advantage be used.

FIG. 1a depicts an example of a power train in a heavy vehicle 100, e.g. a truck, bus or the like, according to an example of an embodiment of the present invention. The vehicle 100 schematically depicted in FIG. 1a comprises only one axle with powered wheels 113, 114 but the invention is also applicable in vehicles which have more than one axle provided with powered wheels. The power train comprises a combustion engine 101 connected in a conventional way, via an output shaft 102 of the engine 101, usually via a flywheel (not depicted), to an automatically operated gearbox 103 via a clutch 106.

However, heavy vehicles used largely in agriculture or on motorways are usually provided, as mentioned above, not with automatic gearboxes in a traditional sense but with "manual" gearboxes in which gear changing is controlled by a control system. This is partly because manual gearboxes are substantially less expensive to manufacture, but also because of their greater efficiency and consequently lower fuel consumption, compared with a conventional automatic gearbox.

The efficiency of automatic gearboxes of the type usually incorporated in passenger cars is often too low, compared with a manually operated gearbox, for them to be justified. The engagement/disengagement of gears in the gearbox 103 is controlled by the vehicle's control system, in this case by means of a control unit 117.

The clutch 106 takes the form in the present example of an automatically controlled clutch but may also take the form of a manually controlled clutch, since control systems in vehicles with manually controlled (driver-controlled) clutches can in a conventional way conduct gear changes with the clutch closed and therefore without using it. Moreover, the clutch 106 is of disc type whereby a friction element (disc) 110 connected to a first gearbox element, e.g. the input shaft 118 of the gearbox 103, engages selectively with the engine's output shaft 102 to transmit driving force from the combustion engine 101 to powered wheels 113, 114 via the gearbox 103. The engagement of the clutch disc 110 with the engine's output shaft 102 is controlled by means of a pressure plate 111 which is movable sideways, e.g. by a lever 112, the function of which is controlled by a clutch actuator 115.

The clutch actuator 115 may for example take the form of an electrically controlled clutch actuator or a pneumatically controlled clutch actuator. The clutch actuator is controlled by means of a control unit 116 but in other respects the specific functions of the clutch actuator and the principles of the actual control of the clutch by the control system by means of the clutch actuator are technology which is well known to specialists and is therefore not described in more detail here.

Control systems in modern vehicles usually consist of a communication bus system comprising one or more communication buses for connecting together a number of electronic control units (ECUs), or controllers, and various components located on the vehicle. Such a control system may comprise a large number of control units, and the responsibility for a specific function may be divided between two or more of them.

For the sake of simplicity, FIG. 1a depicts only two such electronic control units 116, 117 which respectively control in this embodiment the engine 101 and clutch 106 and the gearbox 103 (two or more from among engine, gearbox and clutch may alternatively be arranged to be controlled by one and the same control unit or by other undepicted control units).

Control units of the type depicted are normally adapted to receiving sensor signals from various parts of the vehicle, e.g. from gearbox, engine, clutch and/or other control units or components located on the vehicle. The control of the control units normally depends on signals from other control units, e.g. the control of the gearbox 103 by the control unit 117 will probably depend, for example, on information received from, for example, the control unit which is responsible for the function of the gearbox 103, and from the control unit/units which control engine functions, e.g. the control unit 116.

The control units are further adapted to delivering control signals to various parts and components of the vehicle, e.g. engine, clutch and gearbox, for their control. The present invention may be implemented in any of the above control units, or in some other suitable control unit in the vehicle's control system.

The control of various parts and components in the vehicle, e.g. choice of gear (transmission ratio) and engagement/disengagement of gears in the gearbox, is often governed by programmed instructions. These programmed instructions take typically the form of a computer program which, when executed in a computer or control unit, causes the computer/control unit to effect desired forms of control action, e.g. method steps according to the present invention. The computer program usually takes the form of computer program products 109 which are stored on a memory unit 121 (see FIG. 1b), e.g. ROM (read-only memory), PROM (programmable read-only memory), EPROM (erasable PROM), flash memory, EEPROM (electrically erasable PROM), a hard disc unit etc., in combination with or in the control unit, and are executed by the control unit. The vehicle's behaviour in a specific situation can therefore be adjusted by altering the computer program's instructions.

Figure 1B:
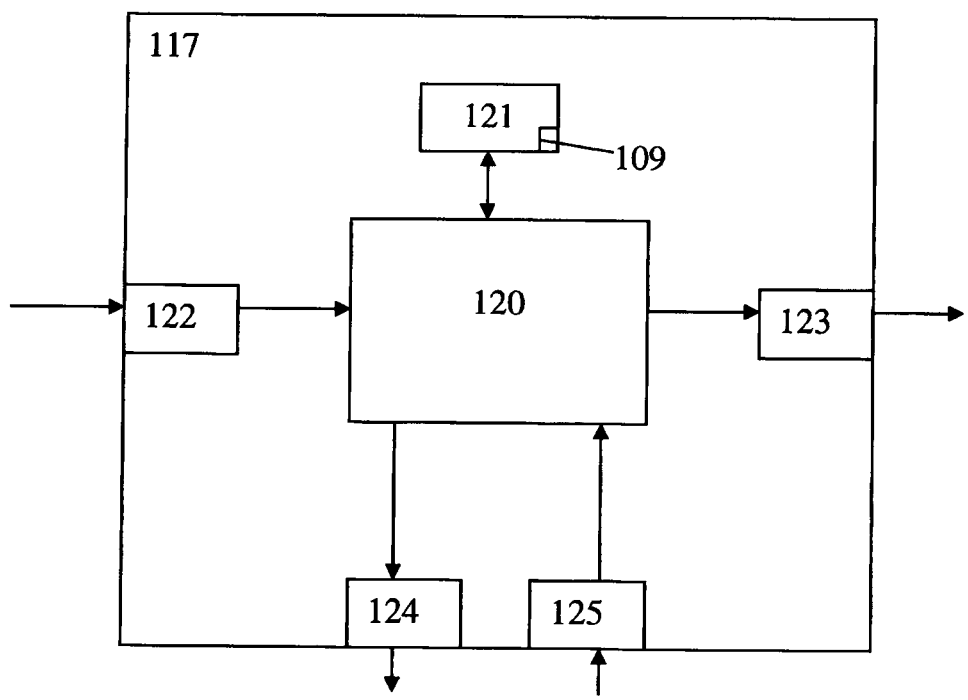
FIG. 1b depicts an example of a control unit in a vehicle control system.

An example of a control unit (the control unit 117) is depicted schematically in FIG. 1b and may comprise a calculation unit 120 which may take the form of substantially any suitable type of processor or microcomputer, e.g. a circuit for digital signal processing (Digital Signal Processor, DSP), or a circuit with a predetermined specific function (Application Specific Integrated Circuit, ASIC). The calculation unit 120 is connected to a memory unit 121 which is situated in the control unit 117 and which provides the calculation unit 120 with, for example, the stored program code 109 and/or the stored data which the calculation unit 120 needs in order to be able to perform calculations. The calculation unit 120 is also adapted to storing partial or final results of calculations in the memory unit 121.

The control unit 117 is further provided with respective devices 122, 123, 124, 125 for receiving and sending input and output signals. These input and output signals may comprise waveforms, pulses or other attributes which the input signal receiving devices 122, 125 can detect as information and which can be converted to signals processable by the calculation unit 120. These signals are then supplied to the calculation unit 120. The output signal sending devices 123, 124 are adapted to converting signals received from the calculation unit 120 in order, e.g. by modulating them, to create output signals which can be transmitted to other parts of the vehicle's control system and/or the component/components for which they are intended. Each of the connections to the respective devices for receiving and sending input and output signals may take the form of one or more from among a cable, a data bus, e.g. a CAN (Controller Area Network) bus, a MOST (Media Orientated Systems Transport) bus or some other bus configuration, or a wireless connection.

The vehicle 100 further comprises drive shafts 104, 105 connected to its powered wheels 113, 114 and driven by an output shaft 107 from the gearbox 103 via a final gear 108, e.g. a conventional differential.

Although the vehicle depicted has a gearbox controlled by a control system whereby both gear changes and gear choices can be conducted entirely automatically by the vehicle's control system without driver influence, there are, as mentioned above, situations in which a certain measure of driver influence may be desirable, so the vehicle 100 in FIG. 1a is so arranged that the driver can at least partly influence the choice of gears. This driver-indicated gear choice may for example be indicated by means of a mode selector explained below and very schematically depicted as a gear lever 119 connected to the control unit 117.

Figure 2:
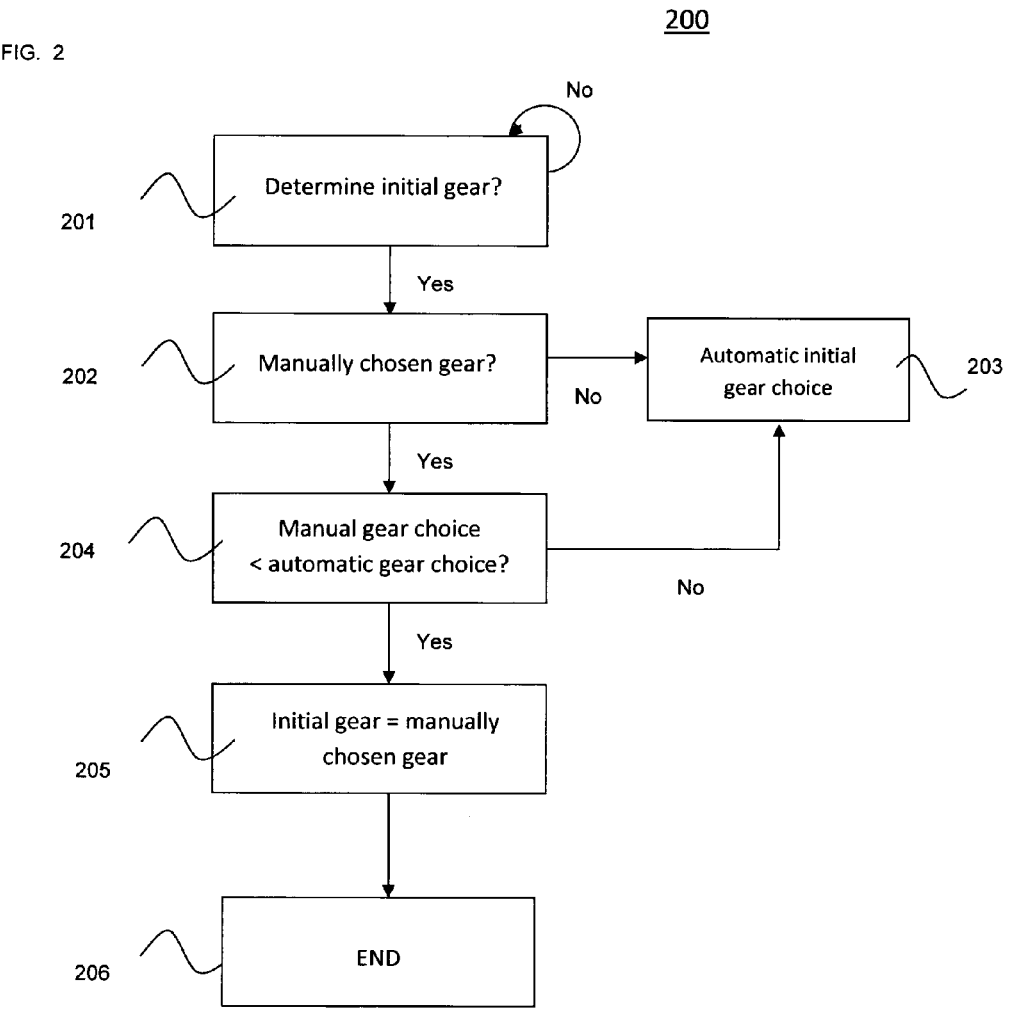
FIG. 2 is a flowchart illustrating an example of a method for control of the clutch actuator according to an example of an embodiment of the present invention.

The present invention pertains to gear choice when setting the vehicle in motion from stationary, and FIG. 2 is an example of a flowchart of a method example 200 according to the present invention. The method is conducted by the vehicle's control system, and step 201 determines whether an initial gear has to be chosen. In heavy vehicles there is normally automatic initial gear choice to determine an appropriate initial gear for use when subsequently setting the vehicle in motion. In other words, initial gear means the gear (the transmission ratio) which is engaged for moving off from stationary.

The reason for this initial gear choice being made is that it is normally not desirable to set the vehicle in motion in the absolutely lowest gear, since in that case a large number of gear changes might be required before the vehicle reaches a desired speed, a procedure which the driver may find inconvenient. From the fuel consumption point of view it may also be preferable that the vehicle be set in motion in as high a gear as possible. Moreover, too low an initial gear may, in unfavourable running surface conditions, result in the torque break which occurs during gear changes causing, for example, fixed running when moving off on an upgrade where the running surface comprises, for example, ice or snow.

For this reason, the vehicle's automated gear choice system chooses an appropriate initial gear which represents a compromise between the clutch wear which occurs when sliding into said chosen gear (the higher the initial gear chosen, the longer the clutch will slide before it fully closes) and the speed which the vehicle reaches in said chosen initial gear (the higher the gear, the higher the speed reached before a gear change becomes necessary).

The control system's determination of initial gear is normally based on current data about both the vehicle's state, e.g. current vehicle weight, and its surroundings, e.g. the gradient of the running surface on which the vehicle is at the time. For example, a higher initial gear may normally be chosen if the vehicle is on a downgrade than on an upgrade.

The initial gear choice may further be based on knowledge of the engine's performance for the respective vehicle, and on the vehicle's current weight (which may vary greatly between, for example, being unladen and fully laden). The various available transmission ratios of the gearbox may also affect said determination.

The gradient of the running surface may for example be determined in several different well-known ways, e.g. on the basis of the running resistance, in the form of a total representation of the resultant of the forces acting upon the vehicle during operation, and may be calculated on the basis of knowing the vehicle's speed, the engine's driving torque, the vehicle's configuration and other ambient data.

The gradient may also be determined by means of any suitable type of gradient sensor, e.g. an accelerometer.

Alternatively, the road gradient may for example be determined by means of a road gradient database provided in the vehicle whereby these data are combined with the vehicle's location which is available for example by means of a GPS receiver, making it possible for the vehicle's control system to also be aware of the nature of the road ahead of the vehicle and use these data in automatic initial gear choice.

The initial gear choice may for example be arranged to be made as soon as the vehicle has come to a halt, or already before it has halted but when its speed has been braked so low that it is very likely to come to a halt soon. Thus a chosen gear may also be engaged as soon as the initial gear choice has been made, i.e. gear engagement may also take place before the vehicle has come to a halt. Alternatively, the initial gear choice may be made at the precise moment when the vehicle is to be set in motion, which may for example be determined by the driver pressing the accelerator pedal, but determination of initial gear at such a late stage, with consequently late gear engagement, may cause delay which will be viewed negatively by the driver.

If step 201 determines that an initial gear is to be chosen, the method moves on to step 202. Instead of prior art determination of initial gear as above, the present invention determines whether the driver has manually indicated an initial gear choice. There are various different ways of effecting this determination, depending on vehicle type, e.g. the vehicle's mode selector may include a position for manual influence upon gear choice.

As mentioned above, the vehicle driver can influence gear choice, e.g. by moving the mode selector sideways to a position in which upshift/downshift can be influenced by the driver moving the mode selector to spring-loaded "+" and "−" positions. This makes it possible for him/her to effect sequential upshift/downshift.

Instead of a mode selector being moved to a position for manual gear change, the vehicle may alternatively be provided with "paddles", situated for example on the steering wheel, for similarly effecting sequential upshift/downshift.

According to the present invention, step 202 therefore determines whether, before the vehicle is brought to a halt (or when it is being brought to a halt, if it has not yet halted), it has been driven in a gear set manually by the driver, e.g. by means of mode selector or paddles. If such is not the case, the method moves on to step 203, which automatically makes an initial gear choice in the usual way as above.

In contrast, if the vehicle has been halted (or is being halted) in a manually chosen gear, the method moves on to step 204, which determines whether the manually chosen gear is a lower gear (i.e. a higher transmission ratio) than the initial gear considered most appropriate according to the vehicle's control system. If the manually chosen gear is lower than the automatically chosen initial gear, the method moves on to step 205, which applies the driver-indicated (manually chosen) gear instead of the automatically chosen initial gear. If however step 204 finds that the manually chosen gear is higher than the automatic gear choice, the method moves on to step 203, since the control system normally chooses an initial gear which is regarded as the highest appropriate gear.

The present invention thus makes it possible to provide assurance that the vehicle will always be set in motion in a gear chosen by the driver, provided that it is lower than the gear most appropriate according to the control system, which affords the advantage that the vehicle's driving in situations such as queuing as above can be conducted in a way which is comfortable for the driver.

The vehicle's driver can thus use the mode selector to set the gearbox to a very low gear (high transmission ratio) in order to adapt the vehicle to the low speed which often prevails in, for example, a slow-moving queue of vehicles. If the control system subsequently finds that a higher gear is required, e.g. because the vehicle has accelerated to an engine speed which calls for a gear change, the control system may change over to automatic gear changing in the usual way, with or without manual input from the driver. The method ends at step 206.

The present invention is described above in relation to a conventional gearbox but is also applicable with other types of gearboxes, e.g. CVT (continuous variable transmission) gearboxes, provided that the vehicle is arranged for automatic choice of transmission ratio as above, and provided that the respective transmission ratio is influenceable by the driver.

Although various embodiments of the present invention are exemplified above, specialists in the respective field will appreciate that variations and modifications are feasible without departing from the invention. The invention is therefore not limited other than as indicated in the attached claims.

The invention claimed is:

1. A method for control of a gearbox of a vehicle, wherein the vehicle has a control system for automatic control of a gearbox, the gearbox is connected to a combustion engine, the gearbox can be set to various different transmission ratios, the control system's choice of the transmission ratio is influenceable by a vehicle's driver, and the control system is configured and operable to choose an initial transmission ratio for setting the vehicle in motion from a stationary position;

the method comprising:

determining a first initial transmission ratio by the control system;

determining a second initial transmission ratio indicated by the vehicle driver, wherein the second initial transmission ratio is a transmission ratio, which was indicated by the vehicle driver, and in which the vehicle was being driven when the vehicle was brought to a halt; and setting the gearbox to the second initial transmission ratio, which was indicated by the vehicle driver, to set the vehicle in motion from the stationary position when the second initial transmission ratio is higher than the first initial transmission ratio determined by the control system.

2. A method according to claim 1, further comprising the driver indicating that the second initial transmission ratio is to be a ratio which has been set manually by the driver.

3. A method according to claim 2, further comprising the driver setting the second initial transmission ratio by means of a mode selector.

4. A method according to claim 1, further comprising applying the method when the vehicle is being set in motion again without the engine having been switched off since the vehicle came to a halt.

5. A method according to claim 1, further comprising setting the gearbox to the first initial transmission ratio immediately after the first initial transmission ratio has been determined.

6. A method according to claim 1, wherein the method is performed when the vehicle is stationary.

7. A method according to claim 1, wherein the gearbox comprises a plurality of distinct gears and the second initial transmission ratio is selected by setting the gearbox to a lower gear than a gear corresponding to the first initial transmission ratio.

8. A computer program product comprising a non-transitory computer-readable medium and computer program code stored on the non-transitory computer-readable medium, the computer program code, when executed on a computer, causing the computer to perform a method for control of a gearbox of a vehicle, wherein the vehicle has a control system for automatic control of a gearbox, the gearbox is connected to a combustion engine, the gearbox can be set to various different transmission ratios, the control system's choice of the transmission ratio is influenceable by a vehicle's driver, and the control system is configured and operable to choose an initial transmission ratio for setting the vehicle in motion from a stationary position;

the method comprising:

determining a first initial transmission ratio by the control system;

determining a second initial transmission ratio indicated by the vehicle driver, wherein the second initial transmission ratio is a transmission ratio, which was indicated by the vehicle driver, and in which the vehicle was being driven when the vehicle was brought to a halt; and setting the gearbox to the second initial transmission ratio, which was indicated by the vehicle driver, to set the vehicle in motion from the stationary position when the second initial transmission ratio is higher than the first initial transmission ratio determined by the control system.

9. A control system for automatic control of a gearbox of a vehicle, wherein the vehicle includes a gearbox connected to a combustion engine, the gearbox being settable to various different transmission ratios:

wherein the control system chooses a transmission ratio which choice may be influenced by the vehicle's driver, the control system is configured and operable to choose an initial transmission ratio for setting the vehicle in motion from a stationary position; and the control system is further configured and operable:

to determine a first initial transmission ratio in the gearbox;

to determine a second initial transmission ratio indicated by the vehicle driver, wherein the second initial transmission ratio is a transmission ratio, which was indicated by the vehicle driver, and in which the vehicle was being driven when the vehicle was brought to a halt; and to set the gearbox to the second initial transmission ratio, which was indicated by the vehicle driver, to set the vehicle in motion from the stationary position when the second initial transmission ratio is higher than the first initial transmission ratio determined by the control system.

10. A vehicle comprises a control system according to claim 9.

* * * * *